Figure 1:
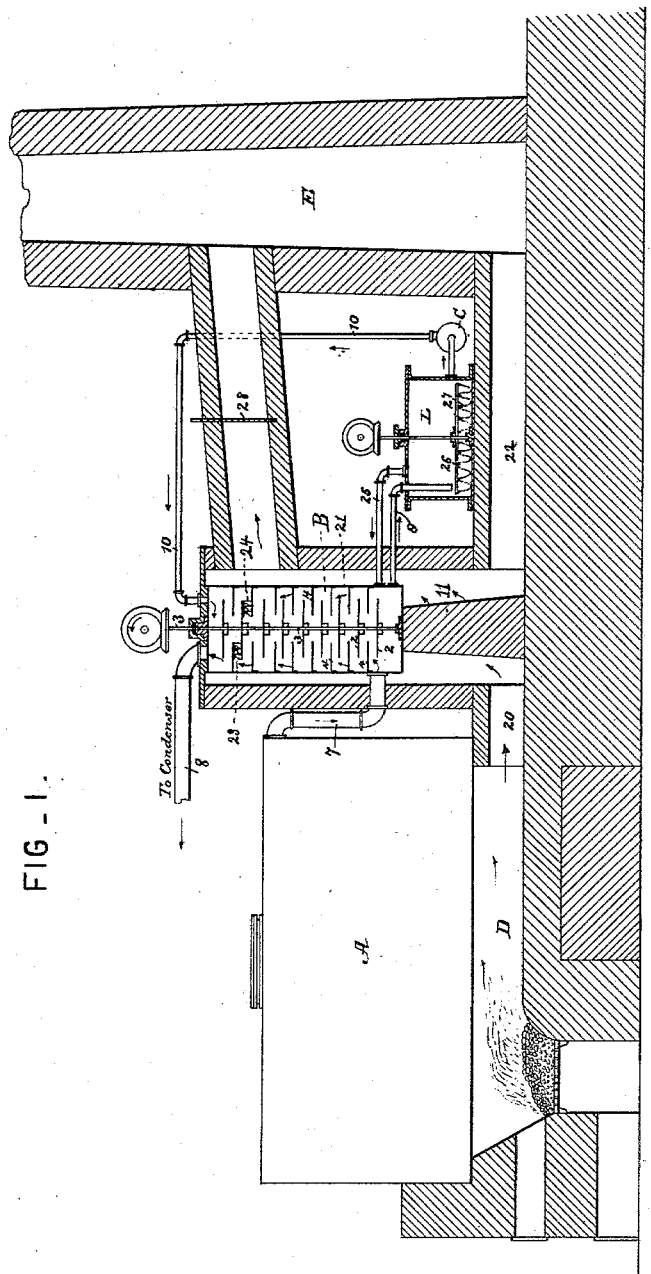

(No Model.)

3 Sheets—Sheet 1.

H. FRASCH.
APPARATUS FOR REFINING PETROLEUM.

No. 490,144.

Patented Jan. 17, 1893.

Attest:
Geo. T. Smallwood
Jas. K. McCathran

Inventor:
Herman Frasch
by Chas. J. Hedrick
Atty (No Model.) 3 Sheets—Sheet 2.
H. FRASCH.
APPARATUS FOR REFINING PETROLEUM.

No. 490,144. Patented Jan. 17, 1893.

FIG_2_

Attest:
Geo. T. Smallwood
Jas. K. McCaihran

Inventor:
Herman Frasch
by Chas. J. Hedrick
Atty (No Model.) 3 Sheets—Sheet 3.

H. FRASCH.
APPARATUS FOR REFINING PETROLEUM.

No. 490,144. Patented Jan. 17, 1893.

Attest:
Geo. T. Smallwood.
Jas. K. McCathran.

Inventor:
Herman Frasch
by Chas. J. Hedrick
Atty

UNITED STATES PATENT OFFICE.

HERMAN FRASCH, OF CLEVELAND, OHIO, ASSIGNOR TO THE SOLAR REFINING COMPANY, OF OHIO.

APPARATUS FOR REFINING PETROLEUM.

SPECIFICATION forming part of Letters Patent No. 490,144, dated January 17, 1893.

Application filed November 1, 1888. Serial No. 289,746. (No model.)

*To all whom it may concern:*

Be it known that I, HERMAN FRASCH, a citizen of the United States, residing at Cleveland, in the county of Cuyahoga and State of Ohio, have invented certain new and useful Improvements in Apparatus for Refining Petroleum, of which the following specification is a full, clear, and exact description.

This invention relates more particularly to apparatus for purifying a certain class of petroleum, generally known as Canadian oil or Lima oil, because chiefly found in Canada and at Lima, Ohio, and characterized by the presence in considerable proportions of sulphur compounds which resist the ordinary treatment for the removal of sulphur, and which give to the oil a peculiarly disagreeable and penetrating odor. In an application for patent filed February 15, 1888, Serial No. 264,131, I have described a process of purifying such oils in which the oil is distilled, and the vapors, after they are given off from the body of the oil in distillation, are subjected to the action of suitable purifying or desulphurizing materials, the latter being in a solid form or in suspension or solution in an oily or resinous liquid.

The apparatus which is the subject matter of the present application, is designed for carrying this process into effect. It comprises an oil still, a purifier, heated preferably to or about the temperature of the still, with the vapor space of which it communicates, and having an exit pipe leading to the condenser, and a pump or other discharging appliance which delivers the material into the said purifier. The still and purifier are heated by means of a fire chamber or fire chambers, and a flue or flues, the purifier being preferably placed in or on a flue for carrying off the products of combustion from a fire chamber under the still, but I may heat the purifier by a separate fire or heating flue, or by means of the same fire chamber and flue through heat imparted to the oil vapors, and by these to the purifier.

It will therefore be understood that the invention extends generally to an arrangement whereby the purifier is heated, so that petroleum vapors pass through the purifier on their way to the condenser wherein they are reduced to the liquid state. During their passage through the purifier, the vapors are subjected to the action of the purifying material, which is delivered into or among them by the feeding appliance. This appliance may be a pump, or an ejector operated by a steam jet, or I may utilize the force of gravitation, the invention extending generally to a feeding appliance in combination with the still and heated purifier. To bring the purifying material more thoroughly into contact with the vapors, I preferably use in the purifier, baffle-plates, or contrivances of a similar nature. Sometimes I make the purifier in two parts and inject the purifying material into one part, and employ baffle-plates in the other. These arrangements constitute special features of the invention.

By having a feeder, which delivers the purifying material into or among the vapors, I am enabled to secure a very intimate and thorough contact between the material and vapor in a comparatively small space, without requiring the vapor to force itself through any fine openings, which would be apt to generate injurious back pressure; I also insure a uniformity of action in all parts of the purifier, there being no liability of the vapor making paths of less resistance for itself through the material, and I am also enabled to renew the purifying material during the operation.

In practice, I prefer to discharge the purifying material repeatedly into the vapors in the purifier, by suitable elevating and discharging appliances, such as a pump and a return pipe, if the purifying material be dissolved or suspended in a liquid, or by an elevator and conduit, if the material is in a solid pulverulent or pasty condition too thick to be pumped. These appliances receive the purifying material after it has acted on the vapors in the purifier, and elevate said material (or put it under pressure) and feed it again into the vapors. The elevator and feeding appliances are placed outside of the purifier, although the invention is not restricted to such disposition.

It is not essential that there should be no condensation of vapors in the purifier, and when this takes place, it is desirable to re-vaporize the condensed liquid, and cause the vapors thus generated to pass into the purifier, so as to insure that no unpurified vapor shall pass on to the condenser; but as the liquid condensed in the purifier contains more or less of the purifying material in suspension or solution, it is not desirable to return it into the main still, unless the latter is provided with suitable appliances to keep the material or the precipitate which it would eventually form with the sulphur compounds in the oil, from settling on the bottom of the still. To revaporize the liquid condensed in the purifier, I therefore provide a supplementary distilling chamber, which receives such liquid and discharges it in the form of vapors into the purifier, to be exposed again to the action of the purifying materials. This supplementary distilling chamber is preferably provided with means for preventing the solid material from settling on the bottom. It may or may not be located outside of the purifier. The pump or elevating and discharging appliances receive or may receive the material from the supplementary distilling chamber.

Figure 2:
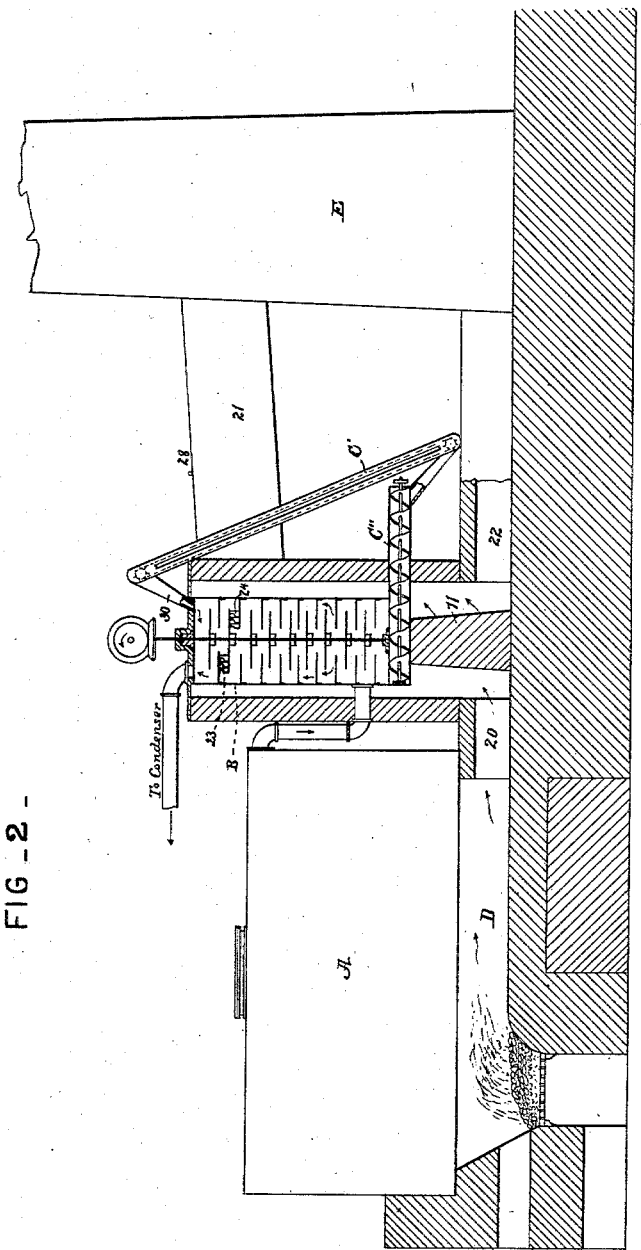
Figure 3:
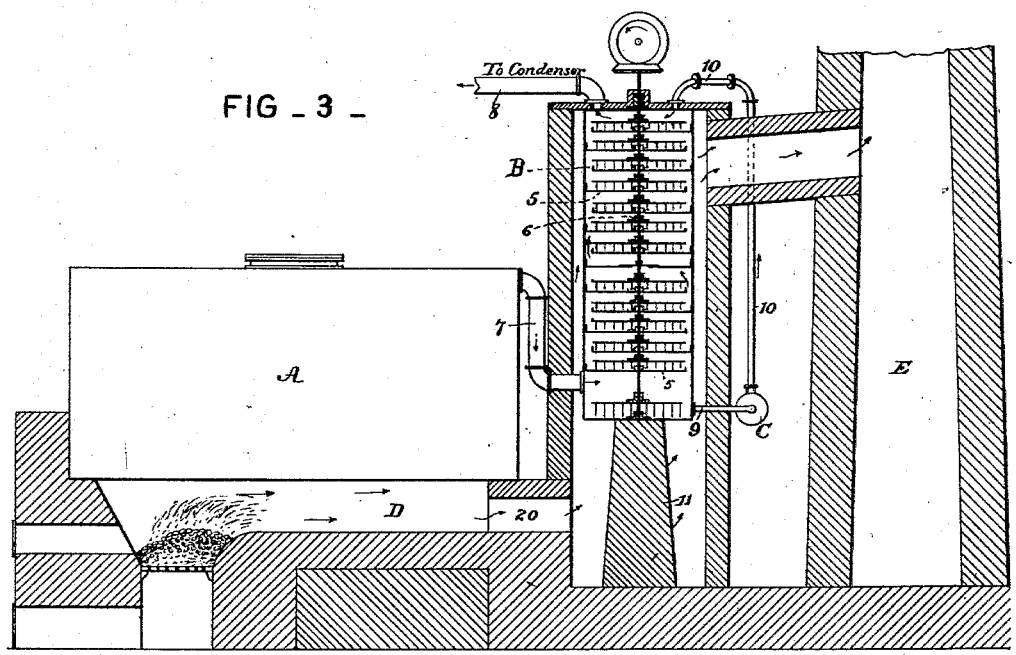
Figure 4:
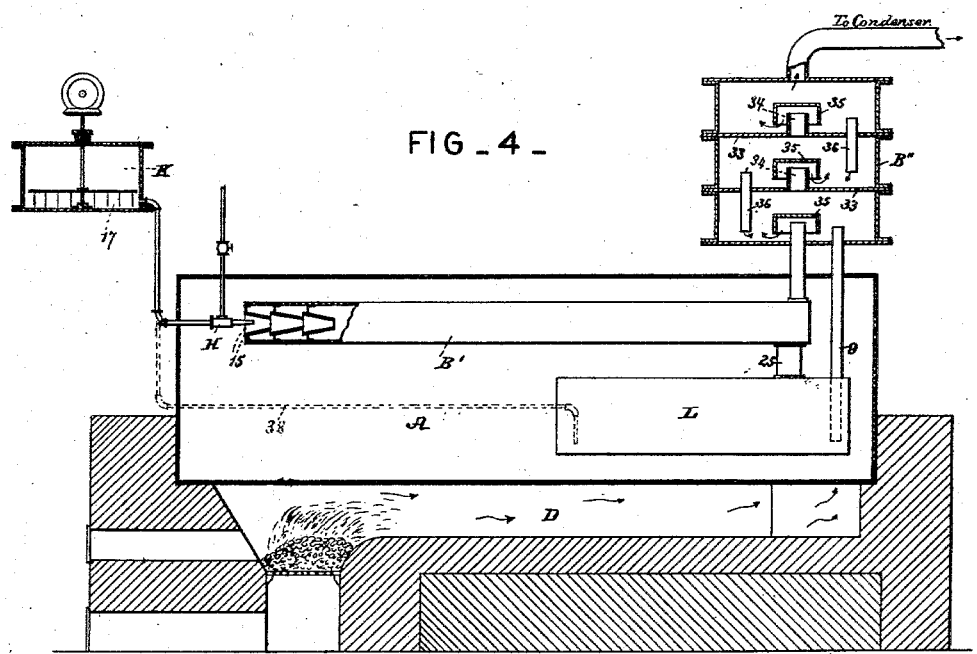

In the accompanying drawings, which form part of this specification, Figure 1 is a vertical section of apparatus constructed in accordance with my invention. Figs. 2, 3, and 4, are similar views of other forms also in accordance with the invention.

Like symbols of reference indicate like parts in each.

Referring to Fig. 1; an ordinary still A, heated by a fire chamber, D, from which the flue 20, and its branches 21, 22, lead to the chimney E, is provided with a purifier B, which is heated, preferably to about the temperature of the still A, so that vapors may pass through the purifier uncondensed. The purifier B is supported on the column 11 in the branch flue 21, which carries off products of combustion from the fire chamber D, and is heated to the desired temperature by said products. The interior of the purifier B is in communication with the vapor space of the still A through the vapor pipe 7, through which the petroleum vapors generated in the still A pass therefrom into the purifier B; and an exit pipe 8 leads the vapors from the purifier to a condenser (not shown) in which they are reduced to a liquid. During their passage through the purifier, the vapors are subjected to the action of the purifying material, say a composition of two parts by weight of black oxide of copper, one part of oxide of lead (litharge), and two parts of oxide of iron or two parts of plaster in place of the oxide of iron, the composition or its ingredients being partly in solution and partly in suspension, in heavy sulphur-containing "Canadian" or similar oil, in which rosin is dissolved. By heavy oil, it is to be understood oil of such gravity as not to be vaporized at the temperature of the purifier.

The purifying material is delivered into or among the vapors in the purifier B by means of the discharging appliance or pump C, which forces the oil and resinous liquid holding the oxides or oxides and plaster in solution and suspension, into the purifier B through the pipe 10, the supply being drawn from the chamber L. The purifier B is in the form of a column, and is provided with baffle plates 2 and 4, the baffle-plates 2 being disks mounted horizontally on an upright shaft 3, and the baffle-plates 4 being rings fastened to the walls of the column B, and projecting inwardly between the disk plates 2 with which they alternate. The shaft 3 and plates 2 are moved (rotated) by means of a bevel gear. The oily resinous liquid and the matters in solution and suspension therein, flow over the baffle plates 2 and 4 and drop from one to the other through the petroleum vapors, which pass upward in a zigzag direction between the said plates. The movement (rotation) of the disk plates 2 assists in carrying the solid matters through the purifier, by throwing off the liquid and solids on to the ring plates 4, from which they descend to the next disk plate by gravity, the flow of the liquid being sufficient to sweep away the solid particles, but if desired mechanical devices or scrapers could be employed, such for example as shown at 23 and 24, the scrapers 23 being stationary and arranged to move any adhering material toward the circumference of the disk plates 2, and the scrapers 24 rotating with a disk plate 2 and moving the material on the next ring plate 4 toward the inner edge thereof. After the purifying material has acted on the vapors in the purifier B, it flows through the pipe 9 into the chamber L, whence it is again pumped up and discharged into the purifier, so that the same material or the same liquid is discharged repeatedly into the vapors. The pump C thus supplies the power to elevate the material as well as to discharge it into the purifier, and the pipes 9 and 10 form a return pipe in which the chamber L is included. The pump C and return pipe 9 and 10 constitute therefore, elevating and discharging appliances, which receive the material from the purifier and deliver it into the same again.

The chamber L is placed in the branch flue 21 so as to be heated by the hot products of combustion from the fire chamber D, so as to vaporize again any oil which may be condensed in the purifier. An exit pipe 25 leads these vapors back again into the purifier. This supplementary distilling chamber L is provided with a rotary stirrer 26, having chains or drags 27, to sweep the bottom, and operated by a bevel gear; these means prevent the solid matter in suspension from collecting on the bottom and keep it in suspension so that it is drawn off with the liquid by the pump C. In the branch flue 21 is shown a damper 28, by which more or less of the products of combustion can be forced to pass under the supplementary distilling chamber.

The purifier B should be of such size as to bring the vapors from the still sufficiently into contact with the purifying material. If the still be such as is commonly used to distill a charge of one hundred (100) barrels of oil, the purifier B may, be, say ten feet in height and four feet in diameter, with the baffle-plates about six inches apart.

In operation, the still is charged with say one hundred (100) barrels of impure Canadian or Lima oil to be distilled, about fifteen per cent (15%) heavy oil, of thirty-six to thirty-nine degrees Baumé (36° to 39° B.,) and the remainder of burning oil distillate boiling at two hundred and twelve degrees Fahrenheit (212° F.) or over. The purifier is supplied with say five (5) barrels of the heavy oil and one barrel of rosin in solution, in the oil and about two thousand five hundred (2500) pounds of the composition or ingredients mentioned, in solution and suspension. The charge may be introduced into the purifier in any suitable way; as for example, the other matters may be mixed with the oil and the whole run through a pipe into the purifier, or into the supplementary chamber from which it is pumped into the purifier. The oil with the matter in solution and suspension therein, flows over the baffle-plates 2 and 4, and runs off through the pipe 9 into the supplementary distilling chamber L, whence it is pumped back or elevated and discharged again into the purifier. The still A, the purifier B, and the supplementary distilling chamber L, being charged, and the pump C, shaft 3 in purifier B, and stirrer 26 being started, the still A, purifier B, and supplementary distilling chamber L are heated, the first to evaporate the burning oil distillate, the second to prevent or diminish the condensation of the vapors, and the third to revaporize any liquid which may condense in the purifier. The vapors from the still A pass through the pipe 7 into the purifier B, through which they ascend, and are in their passage brought into intimate contact with the purifying material, and are desulphurized. The vapors pass from the purifier by the exit pipe 8 to the condenser, where they are reduced to a liquid, which may afterward be washed by sulphuric acid to remove any sulphur remaining in the distillate. The purifying material flows from the purifier B, through the pipe 9, into the supplementay distilling chamber L, from which any liquid oil from condensation in the purifier is driven off and passes as vapor through the pipe 25 back into the purifier.

Referring to Fig. 2:—the still A, and purifier B are the same as described with reference to Fig. 1, only a belt elevator C' is shown for raising the purifying material, which a screw conveyer C" carries from the bottom of the purifier and delivers to the elevator C', which elevates it and discharges through the conduit or spout 30 into the purifier, among the vapors therein. This apparatus is suitable for use with the purifying material in a solid pulverulent form, a charge of say five thousand (5000) pounds of the composition before mentioned being used. The same reference letters and numerals represent the same parts as in Fig. 1, or parts corresponding thereto; and the same is true of Figs. 3 and 4. In Fig. 3, the purifier B is provided with baffle-plates in the form of trays 5, fastened to the walls of the column, and so disposed as to leave openings for the passage of the vapors at the opposite sides of alternate trays, and the rotary shaft 6 is provided with stirrers which dip into the trays. The pipe 9 also leads directly from the bottom of the purifier to the pump C, as it might evidently do with the purifier of Fig. 1.

The elevator C' and conveyer C" of Fig. 2 could of course be used with the form of purifier shown in Fig. 3.

In Fig. 4, the purifier is made in two parts, namely, a large pipe B', which communicates with the vapor space of the still A, through the opening 15, and a small column B", which communicates with the exit end of the pipe B', and is provided with partitions 33, necks 34, cups 35, and overflow pipes 36, which are contrivances of a similar nature to baffle-plates, and cause the ascending vapors to come more thoroughly into contact with the purifying material. Liquid (either supplied originally or from condensation) collects on each partition to the level of the top of the overflow pipe 36, and the cups 35 dip into such liquid and cause the rising vapor to bubble through the liquid. The arrangement is similar to that used in rectifying alcohol. The pipe B' is heated by the vapors in the vapor space of the still A, and the columns B" by the vapors which rise into it, and the proximity of the still A. Both parts B' and B" of the purifier thus become heated to about the temperature of the still, or sufficient for the vapors to pass through uncondensed. The exit pipe 8 leads the vapors to the condenser (not shown) where condensation takes place in any ordinary or suitable way. A steam injector, or steam jet aspirator, and compressor H, sucks the vapors from the vapor space of the still A, and forces them through the pipe B' into the column B". The injector H is also the discharging appliance for forcing the purifying material (say the oxides hereinbefore mentioned, finely divided and in the form of a powder or in solution or suspension in a liquid) into or among the petroleum vapors in said pipe B". As shown, there is a reservoir K, provided with a stirrer 17, from which the injector draws a supply of oxide in suspension, or in suspension and solution, in a suitable liquid. The purifying material is distributed by the steam jet among the vapors in the pipe B' in a finely divided condition, and it (or more or less of it) is carried with said vapors into the column B". The liquid from the condensation which takes place in the column B'', flows through the pipe 9 into the supplementary distilling chamber L, which is immersed in the oil in distillation; revaporation of this condensed liquid takes place, the vapors passing into the pipe B' of the purifier through the exit pipe 25. The purifying material which is carried by the condensed liquid into the supplementary distilling chamber L, remains therein, and if it settles on the bottom will do no harm, as the oil forms a jacket which can never heat the chamber, L above its own temperature. In this form of apparatus, as so far described, it will be observed that no return of the purifying material to the purifier B', B'', has been provided for; but it is evident that this could be done in various ways, as for example by means of a pipe (as indicated in dotted lines at 38) leading from the chamber L to the injector H, in which case a stirring apparatus would be desirable to keep the solid matter in the said chamber suspended in the liquid therein.

Although I have specified certain purifying materials it will be understood that this is only by way of illustration, and that the apparatus can be used with any suitable material; it will also be understood that while the apparatus is especially claimed when used to purify "Canadian" or similar petroleum by the process of my before mentioned application, yet it is also claimed as applied to other processes, or to other uses to which it may be applicable.

I claim as my invention:—

1. The combination with an oil still, of a purifier communicating with the vapor space of the still and provided with a vapor exit pipe, both purifier and still being arranged to be heated, and a feeder adapted to discharge and distribute the purifying material in a divided condition among the vapors in said purifier, substantially as described.

2. The combination with an oil still having a furnace and a flue leading therefrom, of a purifier in the flue, and a feeder adapted to discharge the purifying material among the vapors in said purifier, which purifier communicates with the vapor space of said still and has a vapor exit pipe, substantially as described.

3. The combination with an oil still, of a purifier communicating with the vapor space of the still and provided with a vapor exit pipe and with baffle plates, both purifier and still being arranged to be heated, and a feeder adapted to feed the purifying material to the baffle plates in said purifier, substantially as described.

4. The combination with an oil still, of a purifier communicating with the vapor space of the still and provided with a vapor exit pipe, a feeder, and a supplementary distilling chamber, said purifier, still and chamber being all arranged to be heated, substantially as described.

5. The combination with an oil still, of a purifier communicating with the vapor space of the still and provided with a vapor exit pipe and with baffle plates and also with moving parts which assist in carrying the purifying material through the purifier, both purifier and still being arranged to be heated, and a feeder adapted to feed the purifying material to the baffle-plates in said purifier, substantially as described.

In testimony whereof I have signed this specification in the presence of two witnesses.

HERMAN FRASCH.

Witnesses:
T. W. LOTHMAN,
W. H. SMITH.